Patented July 11, 1933

1,917,381

UNITED STATES PATENT OFFICE

CARL J. MALM AND CHARLES L. FLETCHER, OF ROCHESTER, NEW YORK, ASSIGNORS TO EASTMAN KODAK COMPANY, OF ROCHESTER, NEW YORK, A CORPORATION OF NEW YORK

PREPARATION OF CELLULOSE NITRATE-ACYLATES

No Drawing.     Application filed December 31, 1930.   Serial No. 505,970.

This invention relates to a process of making a cellulose nitrate-acylate which comprises the three distinct steps of (1) partial acylation of cellulose preferably with an acid anhydride, (2) nitration of the partially acylated cellulose and (3) further acylation of free hydroxyl groups.

An object of our invention is to provide a process in which the amount of nitrogen introduced into the cellulose molecule may be regulated by conducting the nitration as a distinct step between two acylation steps. Previously, for instance in British Patent 283,595, corresponding to U. S. Patent 1,783,771, it has been known to fully esterify cellulose by means of an excess of acetic acid anhydride and in the course of the process, after a more or less advanced stage of the esterification of the cellulose, to add nitric acid to the mixture. This prior process has the disadvantage that it is difficult to regulate the nitrogen content desired in the final cellulose derivative. Previous processes have been too uncertain in the factor of the proportion of the various radicals introduced into the cellulose to assure much uniformity in the product produced.

Another object of the invention is to provide a process of making cellulose-nitrate-acylate which results in a saving in the use of acid anhydride in the process. In the process usually performed when the acid anhydride is used previous to the nitration of the cellulose, a full acylation formula has been used, and this makes necessary the displacement of many of the acyl groups by the nitrate groups upon the subsequent nitration, thus using more anhydride than is necessary to supply the acyl groups which remain attached to the cellulose molecule in the final product. The present process makes possible the use of much less anhydride than formerly used, although obviously the process is effective even though a greater amount is used in the third step than is necessary.

Another object of the invention is to provide a process of producing a nitrated multi-acylated cellulose with each radical present in the proportion desired. This may be accomplished by using an acid anhydride in the third step of the process which is different than that used in the first step. Thus if acetic anhydride is used for the initial acetylation and butyric anhydride is used for the final acetylation after the nitration step, there will be a cellulose-nitrate-acetate-butyrate produced.

Our invention contemplates the use in the initial acylation step of only a portion of the total acid anhydride required for full acylation. It also contemplates the carrying out of the nitration of the partially acylated cellulose as a separate and distinct step between the two acylation steps of the process. This is much more effective than the simultaneous nitration and acylation as a method of adding nitrogen to the cellulose both from the standpoint of economy and of control.

An example illustrative of our invention is as follows: About 100 lbs. of cotton linters may be pretreated with a mixture of about 700 lbs. of glacial acetic acid and 2 lbs. of 95% sulphuric acid or other acetylation catalyst at approximately 100° F. for 2–5 hours. The mixture is then cooled to about 50–70° F. and about 160 lbs. of 85% acetic anhydride is added. The temperature of the reaction mixture is then allowed to rise slowly to a maximum of about 90° F. where it is kept until all acetic anhydride is used up and no further acetylation takes place. At this point 5–10 lbs. of a nitrating agent such as nitric acid, fuming nitric acid, or liquid or gaseous $NO_2$, $N_2O_3$, $N_2O_4$, $N_2O_5$, is added, and the mixture is kept at the same temperature for less than an hour. About 100 lbs. of acetic anhydride is then added and the mixing is continued until a satisfactory dope is obtained. If desired, the product may be hydrolyzed to solubility in acetone and worked up in the usual manner.

It is to be understood that although the acetyl radical will be the one used more extensively in this process, other fatty acid radicals such as propionic, butyric, stearic or unsaturated radicals such as crotonic, acrylic, etc. may be substituted by use of the corresponding anhydride to form the cellulose nitrate-acylate desired, or as pointed out previously, a plurality of different anhydrides may be used in the process to produce a nitrated-multi-acylated-cellulose. In case it is desired to use, for example, butyric anhydride instead of acetic anhydride, about one and one-half times the former should be used. The amount of a fatty acid anhydride to be used to that of acetic anhydride used in the example is directly proportional to their respective molecular weights.

Although we have found that the pretreatment of the cellulose with fatty acids and catalyst enhances the reactivity of the cellulose with the anhydride, this step may be dispensed with and a product of good quality produced.

Any suitable form of cellulose may be used instead of the cotton linters as in the example, such as scrap cotton cloth, long fibered cotton, alpha cellulose, high grade wood pulp and the like.

Altho by the above example when employing 160 lbs. of 85% anhydride per 100 pounds of cellulose, it is possible to introduce as much as 30–35% acetyl into the cellulose by the first step of our esterification process, it will be understood that the quantity of acetyl introduced by the first step may be increased or decreased merely by increasing or decreasing the amount of anhydride employed. We wish to make it clear that we contemplate by our first acylation step to employ a partial formula for only partially acylating the cellulose and allowing this partial formula to completely exhaust its acylating properties before adding the nitrating agent. We then contemplate permitting the nitrating agent to completely exhaust its esterifying properties before adding the second acylating mixture, which obviously may be more, less or just enough to complete the esterification of the cellulose. It will be understood, therefor, that the advantage of our process lies in the use of three distinct steps which lead to economy and far more accurate control of the composition of the final product.

What we now claim as our invention and desire to secure by Letters Patent of the United States is:

1. A process of making a cellulose nitrate-acylate which comprises the following distinct steps: (1) acylating cellulose to form a cellulose acylate having less than 3 acyl groups, (2) nitrating the partially acylated cellulose and (3) further acylating the cellulose, each step being carried out only upon substantial completion of that preceding it.

2. A process of making a cellulose nitrate-acylate which comprises acylating cellulose to form a cellulose acylate having less than 3 acyl groups with an amount of acylating agent substantially less than required to fully acylate the cellulose, treating the partially acylated cellulose with a nitrating agent and further acylating the resulting product.

3. A process of making a nitrated multi-acylated cellulose which comprises acylating cellulose to form a cellulose acylate having less than 3 acyl groups with an amount of acylating agent equivalent to less than 2 parts of acetic anhydride to 1 part of cellulose, treating the acylated cellulose with a nitrating agent and treating the resulting product with an acylating agent different from that used in the partial acylation step.

4. A process of making a cellulose nitrate-acylate which comprises acylating cellulose to form a cellulose acylate having less than 3 acyl groups with an amount of an acylating agent equivalet to less than 2 parts of acetic anhydride to 1 part of cellulose, treating the partially acylated cellulose with a nitration agent selected from the group consisting of $N_2O_3$, $NO_2$, $N_2O_4$, $N_2O_5$, fuming nitric acid, and nitric acid, and further acylating the resulting product.

5. A process of making a cellulose nitrate-acylate which comprises acylating cellulose to form a cellulose acylate having less than 3 acyl groups with an amount of an acylating agent equivalent to less than 2 parts of acetic anhydride to 1 part of cellulose, treating the partially acylated cellulose with fuming nitric acid and further acylating the resulting product.

6. A process of making a cellulose nitrate-acylate which comprises acylating cellulose to form a cellulose acylate having less than 3 acyl groups with less than 2 parts of acetic anhydride to 1 part of cellulose, treating the partially acylated cellulose with a nitrating agent and further acylating the resulting product.

7. A process of making a cellulose nitrate-acylate which comprises acetylating cellulose to form a cellulose acylate having less than 3 acyl groups with less than 2 parts of acetic anhydride to 1 part of cellulose, treating the partially acetylated cellulose with a nitrating agent and further acylating the resulting product with acetic anhydride.

8. A process of making a nitrated multi-acylated cellulose which comprises acetylating cellulose to form a cellulose acylate having less than 3 acyl groups with an amount of acetic anhydride less than 2 parts of the anhydride to 1 part of cellulose, treating the partially acetylated cellulose with a nitrating agent and further acylating the resulting product with butyric anhydride.

9. A process of making a cellulose nitrate-acylate which comprises acylating cellulose to form a cellulose acylate having less than 3 acyl groups with 3 parts of butyric anhydride to 1 part of cellulose, treating the partially acylated celluose with a nitrating agent and further acylating the resulting product with butyric anhydride.

Signed at Rochester, N. Y. this 29th day of December, 1930.

CARL J. MALM.
CHARLES L. FLETCHER.